US009770996B2

(12) United States Patent
Chen et al.

(10) Patent No.: US 9,770,996 B2
(45) Date of Patent: Sep. 26, 2017

(54) SYSTEMS AND METHODS FOR POWERING ELECTRIC VEHICLES USING A SINGLE OR MULTIPLE POWER CELLS

(71) Applicant: Gogoro Inc., Hong Kong (CN)

(72) Inventors: Ching Chen, Taipei (TW); Yi-Tsung Wu, New Taipei (TW); Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 488 days.

(21) Appl. No.: 14/453,156

(22) Filed: Aug. 6, 2014

(65) Prior Publication Data

US 2015/0042157 A1    Feb. 12, 2015

Related U.S. Application Data

(60) Provisional application No. 61/862,852, filed on Aug. 6, 2013.

(51) Int. Cl.
*B60L 1/00*    (2006.01)
*B60L 3/00*    (2006.01)
(Continued)

(52) U.S. Cl.
CPC ......... *B60L 11/1855* (2013.01); *B60L 11/005* (2013.01); *B60L 11/18* (2013.01);
(Continued)

(58) Field of Classification Search
CPC ...... B60L 11/00; B60L 11/1855; B60L 11/18; B60L 11/1851
(Continued)

(56) References Cited

U.S. PATENT DOCUMENTS 1,387,848 A    8/1921    Good
3,664,450 A    5/1972    Udden et al.
(Continued)

FOREIGN PATENT DOCUMENTS

CA    2 865 976 A1    9/2013
EP    0 693 813 A1    1/1996
(Continued)

OTHER PUBLICATIONS

Luke et al., "Apparatus, Method and Article for Authentication, Security and Control of Power Storage Devices, Such as Batteries," Office Action mailed Aug. 21, 2014, for U.S. Appl. No. 14/023,344, 13 pages.

(Continued)

*Primary Examiner* — Carlos Amaya
(74) *Attorney, Agent, or Firm* — Perkins Coie LLP

(57) ABSTRACT

Electric vehicles such as scooters can have a first operating mode in which energy is supplied by a single electrical energy storage device and a second operating mode in which energy is supplied by multiple electrical energy storage devices. A circuit element can be included in the circuit connecting the electrical energy storage devices to a prime mover such as a traction motor. The circuit element has a first, electrically conductive, state that couples only the single electrical energy storage device to a traction motor and a second, electrically non-conductive, state that couples the multiple electrical energy storage devices to the prime mover. The transition of the circuit element from the first state to the second state can occur by irreversibly fracturing the circuit element upon installation of multiple electrical energy storage devices or by a controller transitioning the circuit element from the first state to the second state.

18 Claims, 6 Drawing Sheets

(51) Int. Cl.
   *H02G 3/00* (2006.01)
   *B60L 11/18* (2006.01)
   *B60L 11/00* (2006.01)

(52) U.S. Cl.
   CPC ....... *B60L 11/1851* (2013.01); *B60L 11/1877* (2013.01); *B60L 2200/12* (2013.01); *B60L 2260/20* (2013.01); *Y02T 10/7005* (2013.01); *Y02T 10/705* (2013.01)

(58) Field of Classification Search
   USPC .......................................................... 307/9.1
   See application file for complete search history.

(56) References Cited

U.S. PATENT DOCUMENTS

| | | | |
|---|---|---|---|
| 3,678,455 A | 7/1972 | Levey | |
| 4,087,895 A | 5/1978 | Etienne | |
| 4,129,759 A | 12/1978 | Hug | |
| 4,216,839 A | 8/1980 | Gould et al. | |
| 5,146,172 A | 9/1992 | Mehr-Ayin et al. | |
| 5,187,423 A | 2/1993 | Marton | |
| 5,189,325 A | 2/1993 | Jarczynski | |
| 5,236,069 A | 8/1993 | Peng | |
| 5,339,250 A | 8/1994 | Durbin | |
| 5,349,535 A | 9/1994 | Gupta | |
| 5,544,784 A | 8/1996 | Malaspina | |
| 5,596,261 A | 1/1997 | Suyama | |
| 5,627,752 A | 5/1997 | Buck et al. | |
| 5,631,536 A | 5/1997 | Tseng | |
| 5,642,270 A | 6/1997 | Green et al. | |
| 5,815,824 A | 9/1998 | Saga et al. | |
| 5,839,800 A | 11/1998 | Koga et al. | |
| 5,898,282 A | 4/1999 | Drozdz et al. | |
| 5,998,963 A | 12/1999 | Aarseth | |
| 6,016,882 A | 1/2000 | Ishikawa | |
| 6,177,867 B1 | 1/2001 | Simon et al. | |
| 6,177,879 B1 | 1/2001 | Kokubu et al. | |
| 6,403,251 B1 | 6/2002 | Baggaley et al. | |
| 6,498,457 B1 | 12/2002 | Tsuboi | |
| 6,515,580 B1 | 2/2003 | Isoda et al. | |
| 6,583,592 B2 | 6/2003 | Omata et al. | |
| 6,593,713 B2 | 7/2003 | Morimoto et al. | |
| 6,796,396 B2 | 9/2004 | Kamen et al. | |
| 6,822,560 B2 | 11/2004 | Geber et al. | |
| 6,854,773 B2 | 2/2005 | Lin | |
| 6,899,268 B2 | 5/2005 | Hara | |
| 6,952,795 B2 | 10/2005 | O'Gorman et al. | |
| 7,010,682 B2 | 3/2006 | Reinold et al. | |
| 7,131,005 B2 | 10/2006 | Levenson et al. | |
| 7,392,068 B2 | 6/2008 | Dayan et al. | |
| 7,415,332 B2 | 8/2008 | Ito et al. | |
| 7,426,910 B2 | 9/2008 | Elwart | |
| 7,495,543 B2 | 2/2009 | Denison et al. | |
| 7,567,166 B2 | 7/2009 | Bourgine De Meder | |
| 7,592,728 B2 | 9/2009 | Jones et al. | |
| 7,596,709 B2 | 9/2009 | Cooper et al. | |
| 7,617,893 B2 | 11/2009 | Syed et al. | |
| 7,728,548 B2 | 6/2010 | Daynes et al. | |
| 7,761,307 B2 | 7/2010 | Ochi et al. | |
| 7,778,746 B2 | 8/2010 | McLeod et al. | |
| 7,863,858 B2 | 1/2011 | Gangstoe et al. | |
| 7,868,591 B2 | 1/2011 | Phillips et al. | |
| 7,898,439 B2 | 3/2011 | Bettez et al. | |
| 7,908,020 B2 | 3/2011 | Pieronek | |
| 7,923,144 B2 | 4/2011 | Kohn et al. | |
| 7,948,207 B2 | 5/2011 | Scheucher | |
| 7,979,147 B1 | 7/2011 | Dunn | |
| 7,993,155 B2 | 8/2011 | Heichal et al. | |
| 8,006,793 B2 | 8/2011 | Heichal et al. | |
| 8,006,973 B2 | 8/2011 | Toba et al. | |
| 8,013,571 B2 | 9/2011 | Agassi et al. | |
| 8,035,341 B2 | 10/2011 | Genzel et al. | |
| 8,035,349 B2 | 10/2011 | Lubawy | |
| 8,063,762 B2 | 11/2011 | Sid | |
| 8,068,952 B2 | 11/2011 | Valentine et al. | |
| 8,106,631 B2 | 1/2012 | Abe | |
| 8,118,132 B2 | 2/2012 | Gray, Jr. | |
| 8,164,300 B2 | 4/2012 | Agassi et al. | |
| 8,229,625 B2 | 7/2012 | Lal et al. | |
| 8,265,816 B1 | 9/2012 | LaFrance | |
| 8,301,365 B2 | 10/2012 | Niwa et al. | |
| 8,326,259 B2 | 12/2012 | Gautama et al. | |
| 8,354,768 B2 | 1/2013 | Cipriani | |
| 8,378,627 B2 | 2/2013 | Asada et al. | |
| 8,412,401 B2 | 4/2013 | Bertosa et al. | |
| 8,437,908 B2 | 5/2013 | Goff et al. | |
| 8,560,147 B2 | 10/2013 | Taylor et al. | |
| 8,614,565 B2 | 12/2013 | Lubawy | |
| 2001/0018903 A1 | 9/2001 | Hirose et al. | |
| 2002/0023789 A1 | 2/2002 | Morisawa et al. | |
| 2002/0070851 A1 | 6/2002 | Raichle et al. | |
| 2003/0141840 A1 | 7/2003 | Sanders | |
| 2003/0163434 A1 | 8/2003 | Barends | |
| 2003/0209375 A1 | 11/2003 | Suzuki et al. | |
| 2004/0236615 A1 | 11/2004 | Msndy | |
| 2004/0246119 A1 | 12/2004 | Martin et al. | |
| 2006/0047380 A1 | 3/2006 | Welch | |
| 2006/0208850 A1 | 9/2006 | Ikeuchi et al. | |
| 2006/0284601 A1 | 12/2006 | Salasoo et al. | |
| 2007/0026996 A1 | 2/2007 | Ayabe et al. | |
| 2007/0035397 A1 | 2/2007 | Patenaude et al. | |
| 2007/0090921 A1 | 4/2007 | Fisher | |
| 2007/0159297 A1 | 7/2007 | Paulk et al. | |
| 2007/0208468 A1 | 9/2007 | Sankaran et al. | |
| 2009/0024872 A1 | 1/2009 | Beverly | |
| 2009/0033456 A1 | 2/2009 | Castillo et al. | |
| 2009/0082957 A1 | 3/2009 | Agassi et al. | |
| 2009/0112394 A1 | 4/2009 | Lepejian et al. | |
| 2009/0294188 A1 | 12/2009 | Cole | |
| 2010/0026238 A1 | 2/2010 | Suzuki et al. | |
| 2010/0051363 A1 | 3/2010 | Inoue et al. | |
| 2010/0052588 A1 | 3/2010 | Okamura et al. | |
| 2010/0089547 A1 | 4/2010 | King et al. | |
| 2010/0094496 A1 | 4/2010 | Hershkovitz et al. | |
| 2010/0114798 A1 | 5/2010 | Sirton | |
| 2010/0114800 A1 | 5/2010 | Yasuda et al. | |
| 2010/0161481 A1 | 6/2010 | Littrell | |
| 2010/0201482 A1 | 8/2010 | Robertson et al. | |
| 2010/0235043 A1 | 9/2010 | Seta et al. | |
| 2010/0308989 A1 | 12/2010 | Gasper | |
| 2011/0025267 A1 | 2/2011 | Kamen et al. | |
| 2011/0029157 A1 | 2/2011 | Muzaffer | |
| 2011/0032110 A1 | 2/2011 | Taguchi | |
| 2011/0071932 A1 | 3/2011 | Agassi et al. | |
| 2011/0106329 A1 | 5/2011 | Donnelly et al. | |
| 2011/0112710 A1 | 5/2011 | Meyer-Ebeling et al. | |
| 2011/0114798 A1 | 5/2011 | Gemmati | |
| 2011/0120789 A1 | 5/2011 | Teraya | |
| 2011/0148346 A1 | 6/2011 | Gagosz et al. | |
| 2011/0153141 A1 | 6/2011 | Beechie et al. | |
| 2011/0160992 A1 | 6/2011 | Crombez | |
| 2011/0169447 A1 | 7/2011 | Brown et al. | |
| 2011/0200193 A1 | 8/2011 | Blitz et al. | |
| 2011/0202476 A1 | 8/2011 | Nagy et al. | |
| 2011/0224900 A1 | 9/2011 | Hiruta et al. | |
| 2011/0270480 A1 | 11/2011 | Ishibashi et al. | |
| 2011/0279257 A1 | 11/2011 | Au et al. | |
| 2011/0292667 A1 | 12/2011 | Meyers | |
| 2011/0295454 A1 | 12/2011 | Meyers | |
| 2011/0303509 A1 | 12/2011 | Agassi et al. | |
| 2012/0000720 A1 | 1/2012 | Honda et al. | |
| 2012/0013182 A1 | 1/2012 | Minegishi et al. | |
| 2012/0019196 A1 | 1/2012 | Fung | |
| 2012/0038473 A1 | 2/2012 | Fecher | |
| 2012/0062361 A1 | 3/2012 | Kosugi | |
| 2012/0068817 A1 | 3/2012 | Fisher | |
| 2012/0078413 A1 | 3/2012 | Baker, Jr. | |
| 2012/0105078 A1 | 5/2012 | Kikuchi et al. | |
| 2012/0109519 A1 | 5/2012 | Uyeki | |
| 2012/0123661 A1 | 5/2012 | Gray, Jr. | |
| 2012/0126969 A1 | 5/2012 | Wilbur et al. | |
| 2012/0158229 A1 | 6/2012 | Schaefer | |
| 2012/0194346 A1 | 8/2012 | Tsai et al. | |

(56) References Cited

U.S. PATENT DOCUMENTS

| | | |
|---|---|---|
| 2012/0223575 A1 | 9/2012 | Hachiya et al. |
| 2012/0248868 A1 | 10/2012 | Mobin et al. |
| 2012/0248869 A1 | 10/2012 | Itagaki et al. |
| 2012/0256588 A1 | 10/2012 | Hayashi et al. |
| 2012/0259665 A1 | 10/2012 | Pandhi et al. |
| 2012/0274140 A1 | 11/2012 | Ganor |
| 2012/0280573 A1 | 11/2012 | Ohkura et al. |
| 2012/0299537 A1 | 11/2012 | Kikuchi |
| 2012/0316671 A1 | 12/2012 | Hammerslag et al. |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0181582 A1 | 7/2013 | Luke et al. |
| 2013/0200845 A1 | 8/2013 | Bito |
| 2013/0254097 A1 | 9/2013 | Marathe et al. |
| 2013/0264975 A1* | 10/2013 | Kaita ............... B60L 11/1853 318/139 |
| 2013/0282254 A1 | 10/2013 | Dwan et al. |
| 2014/0028089 A1 | 1/2014 | Luke et al. |
| 2014/0111121 A1 | 4/2014 | Wu |
| 2014/0142786 A1 | 5/2014 | Huang et al. |
| 2014/0368032 A1 | 12/2014 | Doerndorfer |

FOREIGN PATENT DOCUMENTS

| | | |
|---|---|---|
| EP | 2 101 390 A2 | 9/2009 |
| EP | 2 230 146 A2 | 9/2010 |
| EP | 2 428 939 A1 | 3/2012 |
| JP | 07-031008 A | 1/1995 |
| JP | 7-36504 U | 7/1995 |
| JP | 9-119839 A | 5/1997 |
| JP | 10-170293 A | 6/1998 |
| JP | 10-307952 A | 11/1998 |
| JP | 11-049079 | 2/1999 |
| JP | 11-51681 A | 2/1999 |
| JP | 11-176487 A | 7/1999 |
| JP | 11-205914 A | 7/1999 |
| JP | 2000-102102 A | 4/2000 |
| JP | 2000-102103 A | 4/2000 |
| JP | 2000-341868 A | 12/2000 |
| JP | 2001-128301 | 5/2001 |
| JP | 2003-118397 | 4/2003 |
| JP | 2003-262525 A | 9/2003 |
| JP | 2005-67453 A | 3/2005 |
| JP | 2006-121874 A | 5/2006 |
| JP | 2008-219953 A | 9/2008 |
| JP | 2009-171646 A | 7/2009 |
| JP | 2009-171647 A | 7/2009 |
| JP | 4319289 B2 | 8/2009 |
| JP | 2010-022148 A | 1/2010 |
| JP | 2010-191636 A | 9/2010 |
| JP | 2010-200405 A | 9/2010 |
| JP | 2010-269686 A | 12/2010 |
| JP | 2011-126452 | 6/2011 |
| JP | 2011-131631 A | 7/2011 |
| JP | 2011-142704 A | 7/2011 |
| JP | 2012-151916 A | 8/2012 |
| KR | 1998-045020 U | 9/1998 |
| KR | 2004-0005146 A | 1/2004 |
| KR | 20100012401 A | 2/2010 |
| KR | 10-0971278 B1 | 7/2010 |
| KR | 20110004292 A | 1/2011 |
| KR | 20110041783 A | 4/2011 |
| KR | 20120020554 A | 3/2012 |
| TW | 200836452 A | 9/2008 |
| TW | I315116 B | 9/2009 |
| TW | M371880 U1 | 1/2010 |
| TW | M379269 U1 | 4/2010 |
| TW | M379789 U1 | 5/2010 |
| TW | M385047 U1 | 7/2010 |
| TW | 201043986 A1 | 12/2010 |
| TW | 201044266 A1 | 12/2010 |
| WO | 98/21132 A1 | 5/1998 |
| WO | 2009/039454 A1 | 3/2009 |
| WO | 2010/033517 A2 | 3/2010 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013/024483 A2 | 2/2013 |
| WO | 2013/024484 A1 | 2/2013 |
| WO | 2013/042216 A1 | 3/2013 |
| WO | 2013/074819 A1 | 5/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/128007 A2 | 9/2013 |
| WO | 2013/128009 A2 | 9/2013 |
| WO | 2013/128009 A3 | 9/2013 |
| WO | 2013/142154 A1 | 9/2013 |
| WO | 2013/144951 A1 | 10/2013 |

OTHER PUBLICATIONS

International Search Report and Written Opinion mailed Nov. 18, 2014, for corresponding International Application No. PCT/US2014/050001, 9 pages.

"Inrunner," 10ikipedia from URL=http://en.wikipedia.org/w/index.php?title=Inrunner&printable=yes on Sep. 28, 2011, 1 page.

"Outrunner," 10ikipedia from URL=http://en.wikipedia.org/w/index.php?title=Outrunner&printable=yes on Sep. 16, 2011, 2 pages.

Chen et al., "Adjusting Electric Vehicle Systems Based on an Electrical Energy Storage Device Thermal Profile," U.S. Appl. No. 61/862,854, filed Aug. 6, 2013, 74 pages.

Chen et al., "Apparatus, System, and Method for Authentication of Vehicular Components ," U.S. Appl. No. 61/783,041, filed Mar. 14, 2013, 84 pages.

Chen et al., "Apparatus, System, and Method for Authentication of Vehicular Components," Office Action mailed Nov. 22, 2013, for U.S. Appl. No. 13/918,703, 35 pages.

Chen et al., "Apparatus, System, and Method for Authentication of Vehicular Components," Notice of Allowance mailed Mar. 25, 2014, for U.S. Appl. No. 13/918,703, 7 pages.

Chen et al., "Apparatus, System, and Method for Authentication of Vehicular Components," U.S. Appl. No. 13/918,703, filed Jun. 14, 2013, 84 pages.

Chen et al., "Apparatus, Method and Article for Providing Vehicle Diagnostic Data," Office Action mailed Dec. 30, 2013, for U.S. Appl. No. 14/022,134, 20 pages.

Chen et al., "Apparatus, Method and Article for Providing Vehicle Diagnostic Data," Office Action mailed Apr. 9, 2013, for U.S. Appl. No. 14/022,134, 20 pages.

Chen et al., "Apparatus, Method and Article for Providing Vehicle Diagnostic Data," U.S. Appl. No. 14/022,134, filed Sep. 9, 2013, 61 pages.

Chen et al., "Apparatus, Method and Article for Providing Vehicle Diagnostic Data," U.S. Appl. No. 61/601,404, filed Feb. 21, 2012, 56 pages.

(56) References Cited

OTHER PUBLICATIONS

Chen et al., "Systems and Methods for Powering Electric Vehicles Using a Single or Multiple Power Cells," U.S. Appl. No. 61/862,852, filed Aug. 6, 2013, 46 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
Huang et al., "Apparatus, Method and Article for Vehicle Turn Signals," U.S. Appl. No. 61/727,403, filed Nov. 16, 2012, 41 pages.
International Preliminary Report on Patentability and Written Opinion for corresponding International Patent Application No. PCT/US2012/048349, issued on Jan. 28, 2014, 5 pages.
International Preliminary Report on Patentability and Written Opinion for corresponding International Patent Application No. PCT/US2012/048354, issued on Jan. 28, 2014, 7 pages.
International Preliminary Report on Patentability and Written Opinion for corresponding International Patent Application No. PCT/US2012/048358, issued on Jan. 28, 2014, 5 pages.
International Preliminary Report on Patentability and Written Opinion for corresponding International Patent Application No. PCT/US2012/048366, issued on Jan. 28, 2014, 5 pages.
International Preliminary Report on Patentability and Written Opinion for corresponding International Patent Application No. PCT/US2012/048367, issued on Jan. 28, 2014, 4 pages.
International Preliminary Report on Patentability and Written Opinion for corresponding International Patent Application No. PCT/US2012/048375, issued on Jan. 28, 2014, 5 pages.
International Preliminary Report on Patentability and Written Opinion for corresponding International Patent Application No. PCT/US2012/048379, issued on Jan. 28, 2014, 5 pages.
International Preliminary Report on Patentability and Written Opinion for corresponding International Patent Application No. PCT/US2012/048380, issued on Jan. 28, 2014, 5 pages.
International Preliminary Report on Patentability and Written Opinion for corresponding International Patent Application No. PCT/US2012/048382, issued on Jan. 28, 2014, 5 pages.
International Preliminary Report on Patentability and Written Opinion for corresponding International Patent Application No. PCT/US2012/048391, issued on Jan. 28, 2014, 6 pages.
International Search Report and Written Opinion for corresponding International Patent Application No. PCT/US2012/048344, mailed Feb. 28, 2013, 9 pages.
International Search Report and Written Opinion for corresponding International Patent Application No. PCT/US2012/048347, mailed Dec. 18, 2012, 8 pages.
International Search Report and Written Opinion for corresponding International Patent Application No. PCT/US2012/048349, mailed Feb. 18, 2013, 9 pages.
International Search Report and Written Opinion for corresponding International Patent Application No. PCT/US2012/048354, mailed Feb. 18, 2013, 11 pages.
International Search Report and Written Opinion for corresponding International Patent Application No. PCT/US2012/048366, mailed Jan. 21, 2013, 10 pages.
International Search Report and Written Opinion for corresponding International Patent Application No. PCT/US2012/048367, mailed Jan. 17, 2013, 8 pages.
International Search Report and Written Opinion for corresponding International Patent Application No. PCT/US2012/048375, mailed Jan. 23, 2013, 9 pages.
International Search Report and Written Opinion for corresponding International Patent Application No. PCT/US2012/048379, mailed Dec. 17, 2012, 9 pages.
International Search Report and Written Opinion for corresponding International Patent Application No. PCT/US2012/048380, mailed Feb. 27, 2013, 9 pages.
International Search Report and Written Opinion for corresponding International Patent Application No. PCT/US2012/048382, mailed Feb. 27, 2013, 9 pages.
International Search Report and Written Opinion for corresponding International Patent Application No. PCT/US2012/063979, mailed Mar. 4, 2013, 10 pages.
International Search Report and Written Opinion for corresponding International Application No. PCT/US2012/048391, mailed Dec. 21, 2012, 9 pages.
International Search Report and Written Opinion for corresponding International Application No. PCT/US2012/058930, mailed Mar. 15, 2013, 11 pages.
International Search Report and Written Opinion for corresponding International Application No. PCT/US2013/070131, mailed Feb. 19, 2014, 17 pages.
International Search Report and Written Opinion for corresponding International Application No. PCT/US2013/065704, mailed Feb. 13, 2014, 13 pages.
International Search Report and Written Opinion for corresponding International Patent Application No. PCT/US2012/048358, mailed Feb. 25, 2013, 9 pages.
International Search Report and Written Opinion for corresponding International Application No. PCT/US2012/059931, mailed Mar. 29, 2013, 13 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power Storage Devices, Such as Batteries," Office Action mailed Jan. 6, 2014, for U.S. Appl. No. 14/017,090, 19 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," Office Action for U.S. Appl. No. 13/646,320, mailed May 30, 2013, 13 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Drive Assembly for Electric Powered Device," U.S. Appl. No. 61/546,411, filed Oct. 12, 2011, 18 pages.
Luke et al., "Electric Device Drive Assembly and Cooling System," U.S. Appl. No. 61/615,144, filed Mar. 23, 2012, 43 pages.
Luke et al., "Modular System for Collection and Distribution of Electric Storage Devices," U.S. Appl. No. 14/202,589, filed Mar. 10, 2014, 76 pages.
Luke et al., "Modular System for Collection and Distribution of Electric Storage Devices," U.S. Appl. No. 61/789,065, filed Mar. 15, 2013, 76 pages.

(56) References Cited

OTHER PUBLICATIONS

Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," Office Action mailed Feb. 26, 2014, for U.S. Appl. No. 13/559,038, 13 pages.
Luke et al., "Apparatus, Method and Article for Authentication, Security and Control of Power Storage Devices, Such as Batteries," Office Action mailed Aug. 19, 2014, for U.S. Appl. No. 13/559,038, 14 pages.
Luke et al., "Apparatus, Method and Article for Authentication, Security and Control of Power Storage Devices, Such as Batteries," Office Action mailed Feb. 25, 2014, for U.S. Appl. No. 14/023,344, 12 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Dynamically Limiting Vehicle Operation for Best Effort Economy," Office Action for U.S. Appl. No. 13/559,264, mailed Aug. 14, 2013, 21 pages.
Luke et al., "Dynamically Limiting Vehicle Operation for Best Effort Economy," Office Action for U.S. Appl. No. 13/559,264, mailed Feb. 12, 2014, 24 pages.
Luke et al., "Dynamically Limiting Vehicle Operation for Best Effort Economy," U.S. Appl. No. 61/511,880, filed Jul. 26, 2011, 52 pages.
Luke et al., "Thermal Management of Components in Electric Motor Drive Vehicles," Office Action mailed Apr. 2, 2014, for U.S. Appl. No. 13/559,259, 11 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," U.S. Appl. No. 61/647,941, filed May 16, 2012, 47 pages.
Luke, "Apparatus, Method and Article for Changing Portable Electrical Power Storage Device Exchange Plans," U.S. Appl. No. 14/204,587, filed Mar. 11, 2014, 56 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," Office Action for U.S. Appl. No. 14/017,081, mailed Jan. 30, 2014, 36 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Microchip, "AN885: Brushless DC (BLDC) Motor Fundamentals," Microchip Technology Inc., 2003, 19 pages.
Taylor et al., "Apparatus, Method and Article for Physical Security of Power Storage Devices in Vehicles," Notice of Allowance for U.S. Appl. No. 13/559,054, mailed May 30, 2013, 32 pages.
Taylor et al., "Apparatus, Method and Article for Physical Security of Power Storage Devices in Vehicles," Office Action for U.S. Appl. No. 13/559,054, mailed Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Taylor et al., "Apparatus, Method and Article for Physical Security of Power Storage Devices in Vehicles," U.S. Appl. No. 61/557,170, filed Nov. 8, 2011, 60 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," Office Action for U.S. Appl. No. 13/559,125, mailed Feb. 24, 2014, 28 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," Office Action mailed Mar. 5, 2014, for U.S. Appl. No. 14/022,140, 8 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.
Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.
Wu et al., "Apparatus, Method and Article for Providing Locations of Power Storage Device Collection, Charging and Distribution Machines," Office Action mailed Nov. 27, 2013, for U.S. Appl. No. 13/559,333, 19 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action mailed Mar. 5, 2014, for U.S. Appl. No. 14/022,147, 12 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Security of Vehicles," U.S. Appl. No. 61/557,176, filed Nov. 8, 2011, 37 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, mailed Feb. 12, 2014, 14 pages.

* cited by examiner

SYSTEMS AND METHODS FOR POWERING ELECTRIC VEHICLES USING A SINGLE OR MULTIPLE POWER CELLS

BACKGROUND

Technical Field

The present disclosure generally relates to vehicles using an electric prime mover or motor powered by one or more rechargeable power cells providing at least a portion of the motive force needed to propel the vehicle.

Description of the Related Art

Gasoline-electric hybrids and all electric vehicles are becoming increasingly common. Such vehicles may achieve a number of advantages over traditional internal combustion engine vehicles. For example, hybrid or electric vehicles may achieve higher fuel economy and have little or even zero tail pipe emissions. In particular, all electric vehicles may not only have zero tail pipe emissions, but may be associated with reducing the overall pollution in densely populated areas. For example, one or more renewable energy sources (e.g., solar, wind, geothermal, hydroelectric) may provide some or all of the electric power used to charge electric vehicle power cells. Also for example, generation plants that burn relatively "clean burning" fuels (e.g., natural gas) which have higher efficiency than internal combustion engines, and/or which employ pollution control or removal systems (e.g., industrial air scrubbers) which are too large, costly or expensive for use with individual vehicles may provide some or all of the electric power used to charge electric vehicle power cells.

Personal transportation vehicles such as gasoline powered scooters and/or motorbikes are ubiquitous in many places, for example in the densely populated areas found in many large cities of Asia. Such scooters and/or motorbikes tend to be relatively inexpensive to acquire, register, and maintain, particularly when compared to automobiles, cars or trucks. Cities with high numbers of combustion engine scooters and/or motorbikes also tend to suffer from high levels of air pollution leading to reduced air quality for all who live and work in the metropolitan area. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified emissions levels are quickly exceeded as the scooters and/or motorbikes age and either not maintained and/or as the scooters and/or motorbikes are modified by owners, for example by intentional or unintentional removal of catalytic converters. Often owners or operators of scooters and/or motorbikes lack the financial resources or the motivation to maintain their vehicles.

Air pollution and the resultant reduction in air quality have a negative effect on human health, being associated with causing or exacerbating various diseases (e.g., numerous reports tie air pollution to emphysema, asthma, pneumonia, and cystic fibrosis, as well as various cardiovascular diseases). Such diseases take large numbers of lives and severely reduce the quality of life of countless others.

BRIEF SUMMARY

The reduced emissions associated with gasoline-electric hybrid vehicles and all-electric vehicles would greatly benefit air quality in densely populated urban areas, and hence tend to improve health of large populations.

Even with the zero tail pipe emissions benefit of all-electric vehicles well understood and their ability to improve the quality of life in large urban areas appreciated, adoption of all-electric vehicles by large populations has been slow. A factor that has hindered a more widespread acceptance and use of hybrid and electric vehicles is the perception that the effective range provided by the electrical energy storage devices carried by the vehicle is limited. Electrical energy storage devices can include any device capable of storing or generating an electrical charge that can provide at least a portion of the power consumed by a vehicular prime mover. Thus, electrical energy storage devices can include batteries such as lead/acid, lithium ion, nickel cadmium, and the like. Electrical energy storage devices can also include capacitive charge storage devices such as supercapacitors or ultracapacitors. Electrical energy storage devices can also include emergent electrochemical technologies, for example fuel cell technologies using membrane or similar technologies using hydrolysis to generate an electric current.

Oftentimes, vehicles may have the ability to accept a number of electrical energy storage devices. For example, some vehicles may operate on a single electrical energy storage device when only one electrical energy storage device is coupled to the vehicle and on two or more electrical energy storage devices when a number of such devices are coupled to the vehicle. The electrical coupling between the electrical energy storage devices installed in a vehicle affects the amount of energy provided by the electrical energy storage devices to the vehicle prime mover. For example, two 12 volt, 50 ampere-hour cells may be connected in series to provide a 24 volt, 50 ampere-hour "stack." Alternatively, two such cells connected in parallel would provide a 12 volt, 100 ampere-hour "stack." Thus, the electrical connection between two or more electrical energy storage devices can determine whether the devices provide access to a greater quantity of power at the potential expense of vehicle range (i.e., electrical energy storage devices connected in electrical series with the prime mover) or to a greater quantity of energy/vehicle range at the potential expense of vehicle power (i.e., electrical energy storage devices connected in electrical parallel with the prime mover).

In some instances, it is advantageous to offer to those consumers having relatively light duty requirements single electrical energy storage device plans that place a vehicle in a first operating mode in which energy stored in a single electrical energy storage device is made available to one or more vehicular systems. Similarly, it is advantageous to offer to those consumers having heavier duty requirements multiple electrical energy storage device plans that place the vehicle in a second operating mode in which energy stored in the multiple electrical energy storage devices is made available to one or more vehicular systems. In at least some implementations, the coupling of the second electrical energy storage device to the vehicle can beneficially place the vehicle in the second operating mode. In at least some implementations, once placed in the second operating mode, the vehicle is precluded from entering or re-entering the first operating mode (i.e., a vehicle using two electrical energy storage devices is precluded from using only a single electrical energy storage device).

The approaches described herein may address some of the issues which have limited adoption of zero tailpipe emission technology, particularly in densely crowded cities, and in populations with limited financial resources. In particular, the approaches discussed herein address issues related to operation of vehicles powered by one or more electrical energy storage devices.

A power delivery system to deliver electric power to an electric vehicle prime mover may be summarized as including a prime mover; a circuit that electrically couples the prime mover to one or more electrical energy storage devices; and at least one circuit element having a number of operational states, including at least: a first state in which an electric vehicle is placed in a first operating mode where energy is supplied by a single electrical energy storage device to the electric vehicle prime mover; and a second state in which an electric vehicle is placed in a second operating mode where energy is supplied by a plurality of electrical energy storage devices to the electric vehicle prime mover; wherein the first state does not preclude a subsequent transition by the at least one circuit element to the second state; and wherein the second state does preclude a subsequent transition by the at least one circuit element to the first state. The at least one circuit element may includes at least one frangible shunt; wherein, in the first mode, the at least one frangible shunt is electrically conductive; and wherein, in the second mode, the at least one frangible shunt is electrically non-conductive. The at least one frangible shunt may include at least one circuit component that is not user replaceable. The at least one frangible shunt may include at least one circuit component that is user replaceable.

The power delivery may further include a controller operably coupled to the at least one circuit element to receive information from the at least one circuit element, the information including data indicative of the state of the at least one circuit element; wherein responsive to receipt of data indicative that the circuit element has entered the second state, the plurality of electrical energy storage devices can be selectively configured to provide at least one of: an operating configuration in which at least a portion of the electrical energy storage devices are placed in electrical series; an operating configuration in which at least a portion of the electrical energy storage devices are placed in electrical parallel; or an operating configuration in which at least some of the electrical energy storage devices are placed in electrical parallel and at least some of the electrical energy storage devices are placed in electrical series.

The power delivery system may further include a controller operably coupled to the at least one circuit element wherein the at least one circuit element includes at least one solid state switching device. In the first state, at least one aspect of the at least one solid state switching device may be modulated by the controller to permit the flow of power from the single electrical energy storage device to the prime mover. In the second state, at least one aspect of the at least one solid state switching device may be modulated by the controller to permit the flow of power from some or all of the plurality of electrical energy storage devices to the prime mover.

The power delivery may further include a communications interface communicably coupled to the controller, the communications interface to receive one or more signals including data to cause the transition of the at least one circuit element from the first state to the second state and to cause the transition of the at least one circuit element from the second state to the first state.

A power delivery method to deliver energy to a vehicular prime mover may be summarized as including delivering in a first operating mode, energy from a single electrical energy storage device to a vehicular prime mover via a circuit containing at least one circuit element in a first state; transitioning the at least one circuit element from the first state to a second state, and transitioning to a second operating mode, responsive to the electrical coupling of a plurality of electrical energy storage devices to the prime mover; and precluding a subsequent transition of the at least one circuit element from the second state to the first state after the at least one circuit element has transitioned to the second state.

The power delivery method may further include receiving at a controller communicably coupled to the at least one circuit element a signal including data indicative of a state of the at least one circuit element.

The power delivery method may further include responsive to the receipt of data indicative that the at least one circuit element has entered the second mode, selectively placing the vehicle in a first operating configuration in which at least a portion of the plurality of electrical energy storage devices are coupled in electrical series with the vehicular prime mover or in a second operating configuration in which at least a portion of the plurality of electrical energy storage devices are coupled in electrical parallel with the vehicular prime mover. Selectively placing the vehicle in a first operating mode or in a second mode may include selectively, autonomously, placing the vehicle in the first operating configuration or in the second operating configuration via the controller. Transitioning the at least one circuit element from the first state to a second state may include physically altering the construction of the at least one circuit element such that an electrical continuity property of the at least one circuit element is changed. Precluding a subsequent transition of the at least one circuit element from the second state to the first state after the at least one circuit element has transitioned to the second state may irreversibly interrupt the electrical continuity property of the at least one circuit element. Irreversibly interrupting the electrical continuity property of the at least one circuit element may include irreversibly interrupting the electrical continuity property of the at least one circuit element using a physical feature disposed on an exterior surface of at least one of the plurality of power cells. Irreversibly interrupting the electrical continuity property of the at least one circuit element may include irreversibly interrupting the electrical continuity property of the at least one circuit element by creating a thermal overload condition or an overcurrent condition using some or all of the plurality of electrical energy storage devices, the thermal overload condition or the overcurrent condition sufficient to irreversibly physically damage the at least one circuit element. Transitioning the at least one circuit element into a second mode of operation may include electrically or electromagnetically altering the electrical continuity property of at least one solid state circuit element.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, super- or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to a prime mover means any device suitable for converting electrical energy to a power output. Such power outputs can include, but are not limited to shaft outputs such as those provided by electric traction motors.

Reference to portable electrical power storage device or electrical energy storage device means any device capable of storing electrical energy and releasing stored electrical energy including, but not limited to, batteries, super- or ultracapacitors. Reference to batteries indicates a specific type of electrical energy storage device that includes a chemical storage cell or cells, for instance rechargeable or secondary battery cells including, but not limited to, nickel cadmium alloy or lithium ion battery cells.

The headings and Abstract of the Disclosure provided herein are for convenience only and do not interpret the scope or meaning of the embodiments.

Figure 1:
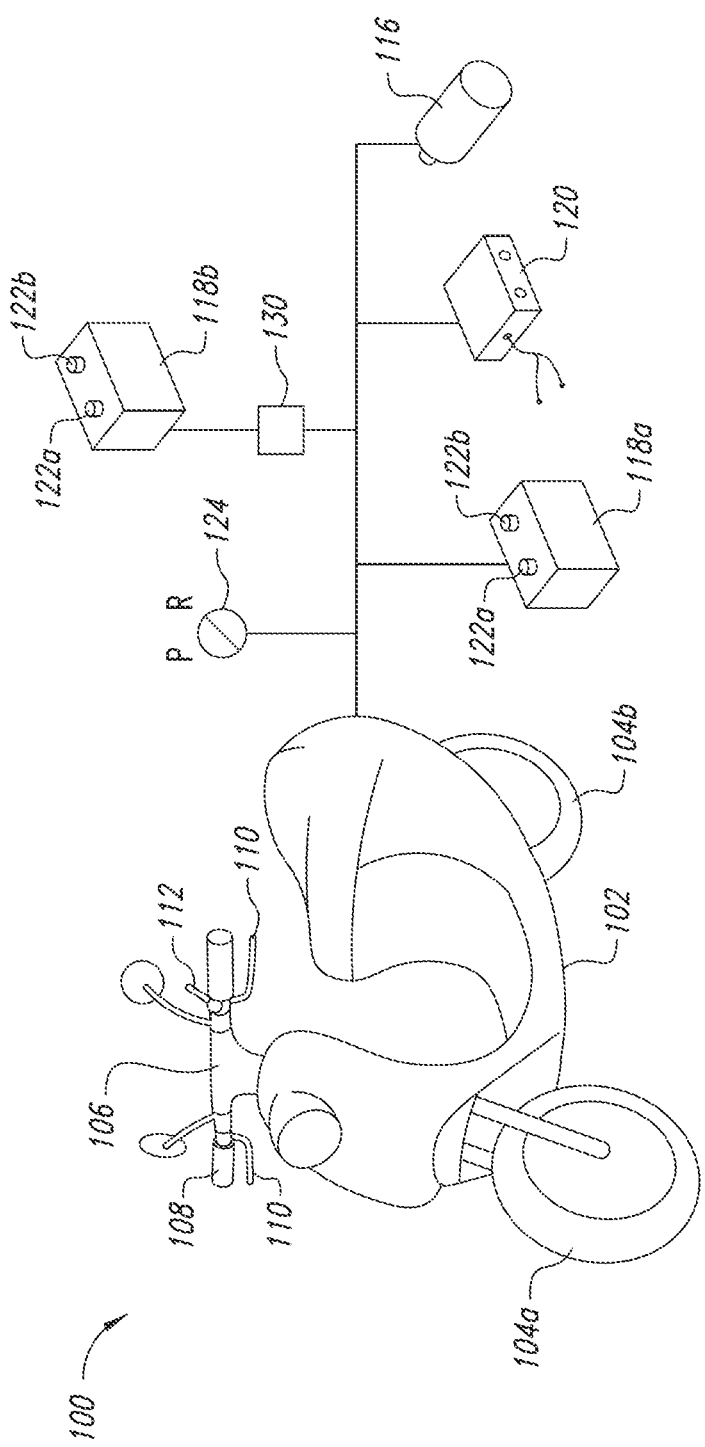
FIG. 1 is an isometric, partially exploded, view of an electric vehicle that includes some or all of the various components or structures described herein, according to one non-limiting illustrated embodiment.

FIG. 1 shows an electric vehicle 100. In at least some implementations, the electric vehicle 100 can include a vehicle that is partially powered using electric energy stored in an electrical energy storage device (e.g., a gasoline/electric hybrid vehicle) or completely powered using electric energy stored in an electrical energy storage device (e.g., an electric vehicle). In at least some implementations, the electric vehicle 100 can include a personal transportation vehicle such as the electric scooter shown in FIG. 1.

As previously noted, combustion engine scooters and motorbikes are common in many large cities, for example in Asia, Europe and the Middle East. The ability to address performance or efficiency issues related to the use of electrical energy storage devices (e.g., secondary batteries) as the main or primary energy source for a vehicle may foster the use of all-electric scooters and motorbikes 108 in place of internal combustion engine scooters and motorbikes, thereby alleviating air pollution, as well as reducing noise.

The electric vehicle 100 includes a frame 102, wheels 104a, 104b (collectively 104), and handle bar 106 with user controls such as throttle 108, brake levers 110, turn indicators switches 112, etc., all of which may be of conventional design. The electric vehicle 100 may also include a power transmission system that operably couples a traction motor 116 to at least one of the wheels 104b. Electrical energy supplied by any number of electrical energy storage devices (two shown, 118a and 118b, collectively "electrical energy storage devices 118" and singly "electrical energy storage device 118") can be provided to the power transmission system to drive the vehicle 100. The vehicle 100 can further include one or more control circuits 120 that control the allocation or distribution of energy from the electrical energy storage devices 118 and any number of vehicular systems. For example, between the electrical energy storage devices 118 and the prime mover 116.

The prime mover 116 may take any of a variety of forms, but typically will be a traction motor or similar permanent magnet induction motor capable of outputting sufficient power (Watts or horsepower) and torque to drive the expected load at desirable speeds and acceleration. In some instances, the prime mover 116 may be a conventional electric motor capable of operating in a drive mode, as well as operating in a regenerative braking mode. In the drive mode, the prime mover 116 consumes electrical energy to drive the wheel 104. In the regenerative braking mode, the prime mover 116 operates as a generator, producing electric current in response to rotation of the wheel 104 and produces a braking effect to slow the vehicle 100.

The electrical energy storage devices 118 powering the electric vehicle 100 may take a variety of forms, for example one or more batteries (e.g., array of battery cells); one or more super-capacitors (e.g., array of super-capacitor cells); one or more ultracapacitors (e.g., array of ultracapacitor cells), or the like. For example, the electrical energy storage devices 118 may take the form of rechargeable batteries (i.e., secondary cells or batteries). Rechargeable batteries may include any current or future developed energy storage device including, but not limited to, lead/acid storage cells, nickel/cadmium storage cells, lithium ion storage cells, thin film lithium storage cells, nickel/metal hydride storage cells, and the like. In at least some implementations, the electrical energy storage devices 118 may be sized to physically fit, and electrically power, personal transportation vehicles 100, such as scooters or motorbikes, and may be portable to allow easy replacement or exchange. Given the relatively high demands imposed by many transportation applications, the electrical energy storage devices 118 are likely to take the form of one or more secondary (i.e., rechargeable) chemical battery cells.

The electrical energy storage devices 118 may include a number of electrical lugs, spades, contacts, and/or terminals (two illustrated, 122a, 122b, collectively "terminals 122"), accessible from an exterior of the electrical energy storage device 118. In at least some implementations, a displaceable slide or door that is closed to prevent inadvertent contact with either or both terminals while the electrical energy storage device 118 is removed from the vehicle 100 can cover all or a portion of the terminals 122. The terminals 122 provide the electrical contacts allowing the delivery of energy from the electrical energy storage devices 118 when the electrical energy storage device discharges. The terminals 122 also provide the electrical contacts allowing the delivery of energy to the electrical energy storage device 118 when the electrical energy storage device charges.

While illustrated in FIG. 1 as posts, the terminals 122 may take any other form accessible from an exterior of the electrical energy storage device 118, including terminals 122 positioned within slots in the electrical energy storage device housing. In at least some implementations, the terminals 122 may be disposed in recesses such as cups or slots within the exterior of the electrical energy storage device 118 to reduce the likelihood of an accidental shorting of the electrical terminals 122 during handling.

As better illustrated and described below, the control circuit 120 includes various components for transforming, conditioning and controlling the distribution and flow of electrical energy from one or more electrical energy storage devices 118 to the various vehicular systems included on or on-board the vehicle 100. In particular, the control circuit 120 can control the flow of energy between the electrical energy storage device 118 and the prime mover 116. In at least some implementations, the control circuit 120 can monitor any number of electrical energy storage device parameters including, but not limited to voltage, current, temperature, charge level, cycles, temperature, etc. of some or all of the electrical energy storage devices 118. The control circuit 120 can alter, adjust, or control the flow and/or distribution of energy from the electrical energy storage devices 118 to various vehicular systems. The control circuit 120 can perform such energy distribution in a defined manner that is responsive to the one or more measured or sensed electrical energy storage device parameters.

One or more switching devices 124 are disposed in, on, or about the vehicle 100. The one or more switching devices can include any current or future developed device capable of manually or automatically providing a selectable electrically continuous pathway for the flow of current therethrough or an electrically discontinuous pathway interrupting the flow of current therethrough. The one or more switching devices 124 can have at least two states. In the first state the plurality of electrical energy storage devices 118 are placed in a first operating configuration in which some or all of the electrical energy storage devices 118 are coupled in an electrical series configuration with the prime mover 116. When the one or more switching devices 124 are in the second state the plurality of electrical energy storage devices 118 are placed in a second operating configuration in which some or all of the electrical energy storage devices 118 are coupled in an electrical parallel configuration with the prime mover 116.

In at least some instances, the one or more switching devices 124 can include one or more manual switches, such as one or more selector or toggle switches. In other instances, the one or more switching devices 124 can include one or more electrical or electromechanical switches, such as one or more relays. In yet other instances, the one or more switching devices 124 can include one or more semiconductor switches, such as one or more insulated gate bipolar transistors (IGBTs).

One or more circuit elements 130 may be disposed in the circuit electrically coupling some or all of the electrical energy storage devices 118 to the prime mover 116. In at least some instances, the one or more circuit elements 130 include one or more frangible or otherwise physically disruptable switching devices, systems, and/or elements. An example of such a frangible or physically disruptable switching device includes an electrical shunt that enters in a non-conductive electrical state upon coupling the second electrical energy storage device 118 to the vehicle 100. In other instances, the one or more circuit elements 130 can include a number of mechanical, electrical, electronic, or electromechanical switching devices, systems, and/or elements. In yet other instances, the one or more circuit elements 130 include one or more solid-state or semiconductor electrical switching devices, systems, and/or elements.

Figure 2:
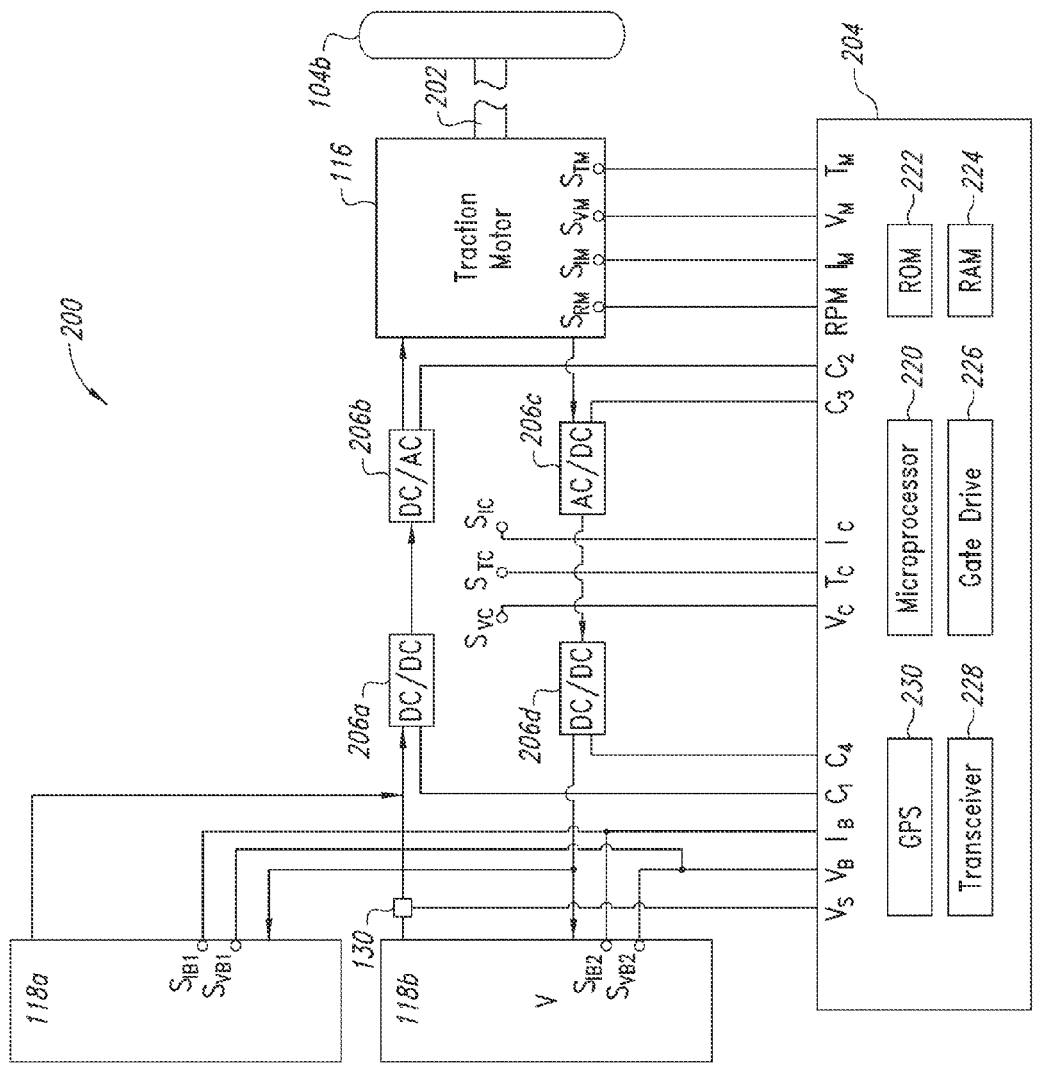
FIG. 2 is a block diagram of some of the components or structures of the vehicle of FIG. 1, according to one non-limiting illustrated embodiment.

FIG. 2 shows the portions of the electric vehicle 100, according to one illustrated embodiment. As illustrated, the prime mover 116 can be operably coupled to a power transmission device such as a shaft 202, which is operably coupled either directly or indirectly to drive at least one wheel 104b of the electric vehicle 100. Although FIG. 2 depicts an example shaft 202, other types of power transmission devices such as belts and sheaves or chains and sprockets are possible.

The control circuit 120 may take any of a large variety of forms, and will typically include a controller 204, one or more power converters 206a-206d (four illustrated), and/or sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$.

As illustrated in FIG. 2, the control circuit 120 may include a first DC/DC power converter 206a that in a drive mode or configuration supplies energy from the electrical energy storage device 118 to the prime mover 116. The first DC/DC power converter 206a may step up a voltage of electrical energy from the electrical energy storage device 118 to a level sufficient to drive the prime mover 116. The first DC/DC power converter 206a may take a variety of forms, for example an unregulated or a regulated switch mode power converter, which may or may not be isolated.

For instance, the first DC/DC power converter 206a may take the form of a regulated boost switch mode power converter, or buck-boost switch mode power converter.

The control circuit 120 may include a DC/AC power converter 206b, commonly referred to as an inverter that in the drive mode or configuration supplies energy from the electrical energy storage device 118 to the prime mover 116 via the first DC/DC converter 206a. The DC/AC power converter 206b may invert electrical power from the first DC/DC converter 206a into an AC waveform suitable to drive the prime mover 116. The AC waveform may be single phase or multi-phase, for example two or three phase AC power. The DC/AC power converter 206b may take a variety of forms, for example an unregulated or a regulated switch mode power converter, which may or may not be isolated. For instance, the DC/AC power converter 206b may take the form of a regulated inverter.

Control signals $C_1$, $C_2$ supplied by the controller 204 control one or more operational aspects of the first DC/DC power converter 206a and the DC/AC power converter 206b, respectively. For example, the controller 204, or some intermediary gate drive circuitry, may supply pulse width modulated gate drive signals to control operation of switches (e.g., metal oxide semiconductor field effect transistors or MOSFETs, bipolar insulated gate transistors or IGBTs) of the first DC/DC and/or DC/AC power converters 206a, 206b.

As further illustrated in FIG. 2, the control circuit 120 may include an AC/DC power converter 206c, commonly referred to as a rectifier that in braking or regenerative braking mode or configuration couples the prime mover 116 to supply power generated thereby to the electrical energy storage device 118. The AC/DC power converter 206c may rectify an alternating current waveform produced by the prime mover 116 to a direct current suitable for charging at least the electrical energy storage device 118. The AC/DC power converter 206c may take a variety of forms, for example a full bridge passive diode rectifier or a full bridge active transistor rectifier.

The control circuit 120 may also include a second DC/DC power converter 206d that electrically couples the prime mover 116 to the electrical energy storage device 118 via the AC/DC power converter 206c. The second DC/DC power converter 206d may step down a voltage of the electrical power generated by the prime mover 116 to a level suitable for the electrical energy storage device 118. The second DC/DC power converter 206d may take a variety of forms, for example an unregulated or regulated switch mode power converter, which may or may not be isolated. For instance, the second DC/DC power converter 206d may take the form of a regulated buck switch mode power converter, synchronous buck switch mode power converter, or buck-boost switch mode power converter.

The AC/DC power converter 206c and the second DC/DC power converter 206d are controlled via control signals $C_3$, $C_4$, respectively, supplied via the controller 204. For example, the controller 204, or some intermediary gate drive controller, may supply pulse width modulated gate drive signals to control operation of switches (e.g., MOSFETs, IGBTs) of the AC/DC and/or the second DC/DC power converters 206c, 206d.

The controller 204 may take a variety of forms that may include one or more integrated circuits, integrated circuit components, analog circuits or analog circuit components. As illustrated the controller 204 includes a microcontroller 220, non-transitory computer- or processor readable memory such as a read only memory (ROM) 222 and/or random access memory (RAM) 224, and may optionally include one or more gate drive circuits 326. In at least some implementations, one or more circuits communicably couple the controller 204 to the circuit element 130. Such a communicable coupling provides the controller 204 with the ability to monitor the state of the circuit element 130. In some instances, such a communicable coupling provides the controller 204 with the ability to change or otherwise alter the state of a mechanical, electromechanical, electronic, solid-state, or semiconductor circuit element 130.

The microcontroller 220 executes one or more machine executable instruction sets or logic to alter, adjust, or control one or more operational aspects of the power system, and may take a variety of forms. For example, the microcontroller 220 may take the form of a microprocessor, programmed logic controller (PLC), programmable gate array (PGA) such as a field programmable gate array (FPGS), and application specific integrated circuit (ASIC), or other such microcontroller device. The ROM 222 may take any of a variety of forms capable of storing processor executable instructions and/or data to implement the control logic. The RAM 224 may take any of a variety of forms capable of temporarily retaining processor executable instructions or data. The microcontroller 220, ROM 222, RAM 224 and optionally gate drive circuit(s) 226 may be coupled by one or more buses (not shown), including power buses, instructions buses, data buses, address buses, etc. Alternatively, circuits in some instances one or more analog may implement at least a portion of the control logic.

The gate drive circuit(s) 226 may take any of a variety of forms suitable for driving switches (e.g., MOSFETs, IGBTs) of the power converters 206 via drive signals (e.g., PWM gate drive signals). While illustrated as part of the controller 204, one or more gate drive circuits may be intermediate the controller 204 and the power converters 206.

The controller 204 may receive process variable signals $S_{TB}$, $S_{VB}$, $S_{IB}$, $S_{TC}$, $S_{VC}$, $S_{IC}$, $S_{TM}$, $S_{VM}$, $S_{IM}$, $S_{RM}$ from one or more sensors. The controller 204, via one or more sets of control logic, may use data included in at least some of the signals as process variable input(s) useful for generating one or more control variable signal output(s) $C_{S1}$-$C_{SN}$. Such control variable signal output(s) $C_{S1}$-$C_{SN}$ may be useful for controlling the energy consumption, energy distribution, and/or energy allocation to one or more vehicular systems. For example, responsive to the receipt of a process variable signal $S_{TB}$ indicative of a temperature in an on-board electrical energy storage device 118 that exceeds a defined threshold value, the controller 204 may generate one or more control variable signal output(s) $C_{S1}$-$C_{SN}$. The control variable signal outputs can reduce energy demand placed on the electrical energy storage devices 118 by altering, adjusting, controlling, or limiting the energy allocated to one or more vehicular systems.

An electrical energy storage device voltage sensor positioned to sense a voltage across the electrical energy storage devices 118 can generate and transmit a process variable signal $S_{VB}$ that includes data indicative of the voltage sensed at the electrical energy storage devices 118.

An electrical energy storage device current sensor positioned to sense a current at the electrical energy storage device 118s can generate and transmit a process variable signal $S_{IB}$ that includes data indicative of the current sensed at the electrical energy storage devices 118.

A power converter temperature sensor positioned to sense a temperature of one or more of the power converter(s) 206 or the ambient environment proximate the power converter(s) 206 can generate and transmit the process variable signal $S_{TC}$ that includes data indicative of the respective sensed temperature at the one or more power converter(s) 206.

A power converter voltage sensor positioned to sense a voltage across one or more of the power converters 206 can generate and transmit the process variable signal $S_{VC}$ that includes data indicative of the sensed voltage at the one or more power converter(s) 206.

A power converter current sensor positioned to sense a current at the one or more of the power converter(s) 206 can generate and transmit the process variable signal $S_{IC}$ that includes data indicative of the sensed charge at the one or more power converter(s) 206.

A traction motor temperature sensor positioned to sense a temperature of the prime mover 116 or ambient environment proximate the prime mover 116 can generate and transmit the process variable signal $S_{TM}$ that includes data indicative of the sensed temperature at the prime mover 116.

A traction motor voltage sensor positioned to sense a voltage across the traction motor 116 can generate and transmit the process variable signal $S_{VM}$ that includes data indicative of the sensed voltage at the prime mover 116.

A traction motor current sensor positioned to sense a current flow through the prime mover 116 can generate and transmit the process variable signal $S_{IM}$ that includes data indicative of the sensed current at the prime mover 116.

A rotational sensor positioned to sense a rotation speed of the prime mover 116 can generate and transmit the process variable signal $S_{RM}$ that includes data indicative of the sensed rotational speed (e.g., in revolutions per minute or "RPM") of the prime mover 116.

As discussed herein, the controller 204 can use data provided by one or more of the process variable signals $S_{TB}$, $S_{VB}$, $S_{IB}$, $S_{TC}$, $S_{VC}$, $S_{IC}$, $S_{TM}$, $S_{VM}$, $S_{IM}$, $S_{RM}$ to control one or more operational aspects of one or more vehicular systems. In particular, responsive to a detected or sensed change in the electrical energy storage device temperature process variable signal that exceeds one or more defined threshold values, the controller 204 can alter, adjust or control a power consumption operational aspect of one or more vehicular systems.

For example, responsive to the receipt of data indicative of an increase in electrical energy storage device temperature, the controller 204 can generate one or more control variable output signals to reduce an operational aspect such as the power consumption of one or more vehicular systems. In some instances, such reduction in the power consumption operational aspect may be in the form of a limitation on the energy made available to the particular vehicular system. In some instances, such energy limitations and/or changes in power allocation may be in the form of a step change in which the energy made available to and/or the power consumption of the vehicular system is reduced in discrete steps dependent upon the magnitude of the deviation between the sensed electrical energy storage device temperature and one or more defined threshold values. By reducing the energy made available to and/or the power consumption of one or more vehicular systems, the load on the electrical energy storage device is decreased and consequently, the temperature of the electrical energy storage device will decrease.

In another example, responsive to the receipt of data indicative of a decrease in electrical energy storage device temperature, the controller 204 may generate one or more control variable output signals to increase the energy allocation to and/or power consumption operational aspect of one or more vehicular systems. In some instances, such an increase in the energy allocation and/or power consumption operational aspect may be in the form of a step change in which the energy made available to and/or the power consumption of the vehicular system is increased in discrete steps dependent upon the magnitude of the deviation between the sensed electrical energy storage device temperature and one or more defined threshold values. By increasing the power consumption of one or more vehicular systems, the load on the electrical energy storage device is increased and the temperature of the electrical energy storage device will increase.

In some instances, the controller 204 can alter, adjust, or otherwise control one or more aspects of the power delivery profile of the electrical energy storage devices 118 coupled to the vehicle 100 based at least in part on one or more signals received from an external source. For example, the controller 204 may receive one or more signals that cause the controller 204 to limit one or more of: a voltage delivery profile of the one or more electrical energy storage devices 118, a current delivery profile of the one or more electrical energy storage devices 118, or some combination thereof. In some instances, such may take the form of a vehicle performance profile that is logically associated with a particular user of the vehicle. In other instances, such may take the form of a subscription under which a supplier and/or distributor leases electrical energy storage devices 118 to vehicle users.

In one example, a user having a two electrical energy storage device 118 subscription may select between several performance plans. Such performance plans may include a "RANGE" plan in which the user is unable to adjust the energy flow from the electrical energy storage devices 118 to the motor (i.e., a fixed speed plan that maximizes available range). Such performance plans may include a "RANGE/PERFORMANCE" plan in which the user is able to change the electrical configuration of the batteries between a first configuration that maximizes available range and a second configuration that maximizes the available acceleration and/or velocity achievable by the vehicle 100.

The controller 204 includes either separate transmitter and receiver systems or a combined transmitter/receiver or transceiver 228. In at least some instances, the transceiver 228 may provide wired and/or wireless communications with components, systems, or devices that are remote from the scooter 100. The transceiver 228 may take a large variety of forms suitable to provide wired or wireless communications. For example, the transceiver 228 may take the form of a cellular phone chipset (also referred as a radio) and antenna(s) to carry on communications with a remote system via a cellular service provider network. The transceiver 228 may implement wireless communications approaches other than cellular based communications. Communications may include receiving information and/or instructions from a remote system or device, as well as transmitting information and/or instructions or queries to a remote system or device.

In at least some instances, the transceiver 228 may include one or more devices capable of communicably coupling with a cellular communications device (e.g., a cell phone or smartphone) carried by a user. Examples of such devices include, but are not limited to any current or future developed radio frequency communications devices such as Bluetooth® devices, near field communications (NFC) devices, and the like. In at least some instances, the transceiver 228 can communicably couple to one or more external systems or devices via a Bluetooth or NFC connection to a cellular device carried by the user.

The controller 204 may include a global positioning system (GPS) receiver 230, which receives signals from GPS satellites allowing the controller 204 to determine a current location of the scooter 100. In at least some implementations, the GPS receiver 230 may include a GPS chipset without provision of a user display on the scooter 100. Any of a large variety of commercially available GPS receivers may be employed. The present location or position may be specified in coordinates, for example a longitude and latitude that is accurate to within 3 meters. Alternatively, other techniques may be employed for determining the present location or position of the scooter 100, for example triangulation based on three or more cellular towers or base stations.

Elevation at a present location may be discernible or determined based on the GPS coordinates. Likewise, elevation changes between a current location and one or more other locations or destinations may be determined using a topographical mapping or other structured format that relates GPS coordinates with elevations. Such may be advantageously employed in better estimating a range of the scooter 100. Alternatively, or additionally, the scooter 100 may include an altimeter that detects elevation, or other sensors, for example an accelerometer, that detects changes in elevation. Such may allow potential energy associated with a relative position of the scooter 100 with respect to hills (e.g., top of hill, bottom of hill) to be taken into account when determining an estimate range. Such may advantageously produce more accurate or estimated range, preventing unnecessary limiting of operational performance. For example, knowledge that the scooter 100 is at or proximate a top of a large hill may lead to an increase in the determined estimated range, bringing a replacement or replenishment location within the range, and preventing the need to limit operational performance. Alternatively, knowledge that the scooter 100 is at or proximate a bottom of a large hill may lead to a decrease in the determined estimated range, indicating that a nearest replacement or replenishment location is outside the estimated range, and causing the limiting of operational performance to occur earlier than otherwise, ensuring that the scooter 100 will reach the replacement or replenishment location.

Figure 3A:
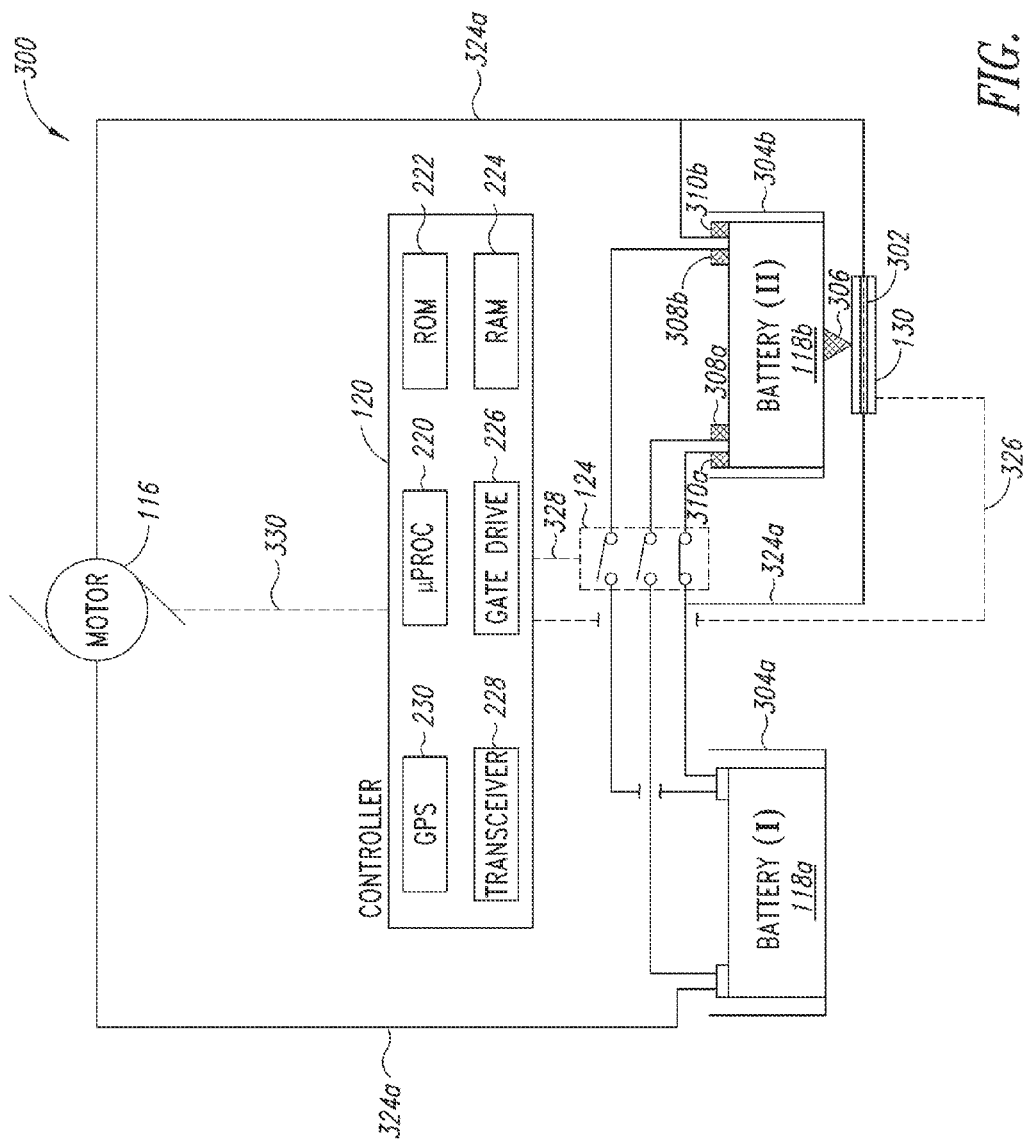
FIG. 3A is a schematic diagram of an electric vehicle with a frangible shunt circuit element in a first state placing the electric vehicle in a first operating mode that includes only a single electrical energy storage device coupled to the electric vehicle prime mover, according to one non-limiting illustrated embodiment.

FIG. 3A shows a schematic diagram of an electric vehicle 100 such as a scooter having two electrical energy storage device receivers 304a, 304b (collectively "receivers 304"), according to one illustrated embodiment. As shown in FIG. 3A, only one electrical energy storage device 118a installed in receiver 304a powers the vehicle 100. With a single electrical energy storage device 118 coupled to the vehicle 100, the vehicle is in a first mode of operation or first operating mode in which the single electrical energy storage device 118 provides energy to the prime mover 116.

Also as shown in FIG. 3A, a frangible shunt type element 302 can provide the circuit element 130. The frangible shunt type element 302 can have an electrically conductive first state in which the frangible element 302 supports the flow of current therethrough and an electrically non-conductive second state in which the frangible element 302 does not support the flow of current therethrough. In at least some implementations, insertion of a second electrical energy storage device 118b into the second electrical energy storage device receiver 304b can change, disrupt, or otherwise place the frangible element 302 in the electrically non-conductive second state. In at least some instances, a protrusion or physical feature 306 on the second receiver 304b or on the electrical energy storage device 118b can fracture the frangible element 302 thereby placing the frangible element 302 in the second, electrically non-conductive, state when the second electrical energy storage device 118b is coupled to the vehicle 100. The use of the frangible element 302 beneficially provides a simple and robust system for converting the vehicle 100 from the first operating mode to the second operating mode.

In at least some instances, the frangible element 302 can include one or more vehicle user replaceable components. For example, the frangible element 302 may include spades, lugs, or threads that permit a user to replace an electrically non-conductive frangible element 302 with an electrically conductive replacement frangible element 302. In other instances, the frangible element 302 can include one or more non-user replaceable components. For example, the frangible element 302 may include one or more components, devices, or systems requiring replacement or resetting by qualified service personnel.

One or more sets of terminals, contacts, or the like 308a, 308b, 310a, 310b (collectively "terminals 308" and "terminals 310") may be disposed in the second electrical energy storage device receiver 304b. The terminals 308 and 310 in the second electrical energy storage device receiver 304b electrically couple the second electrical energy storage device 118b to the vehicle 100 via the terminals 122 on the second electrical energy storage device 118b.

One or more circuits 328 communicably couple the controller 120 to the one or more switching devices 124. In at least some instances, the one or more circuits 328 communicate information between the controller 120 and the one or more switching devices 124. In at least some instances, such information may include data indicative of the position of the one or more switching devices 124. In at least some instances, such information may include data indicative of one or more control variable output signals generated by the controller 120. Using such control variable output signals, the controller 120 changes the state of the one or more switching devices 124. The controller 120 can communicate such control variable output signals to the one or more switching devices 124 via the one or more circuits 328.

Figure 3B:
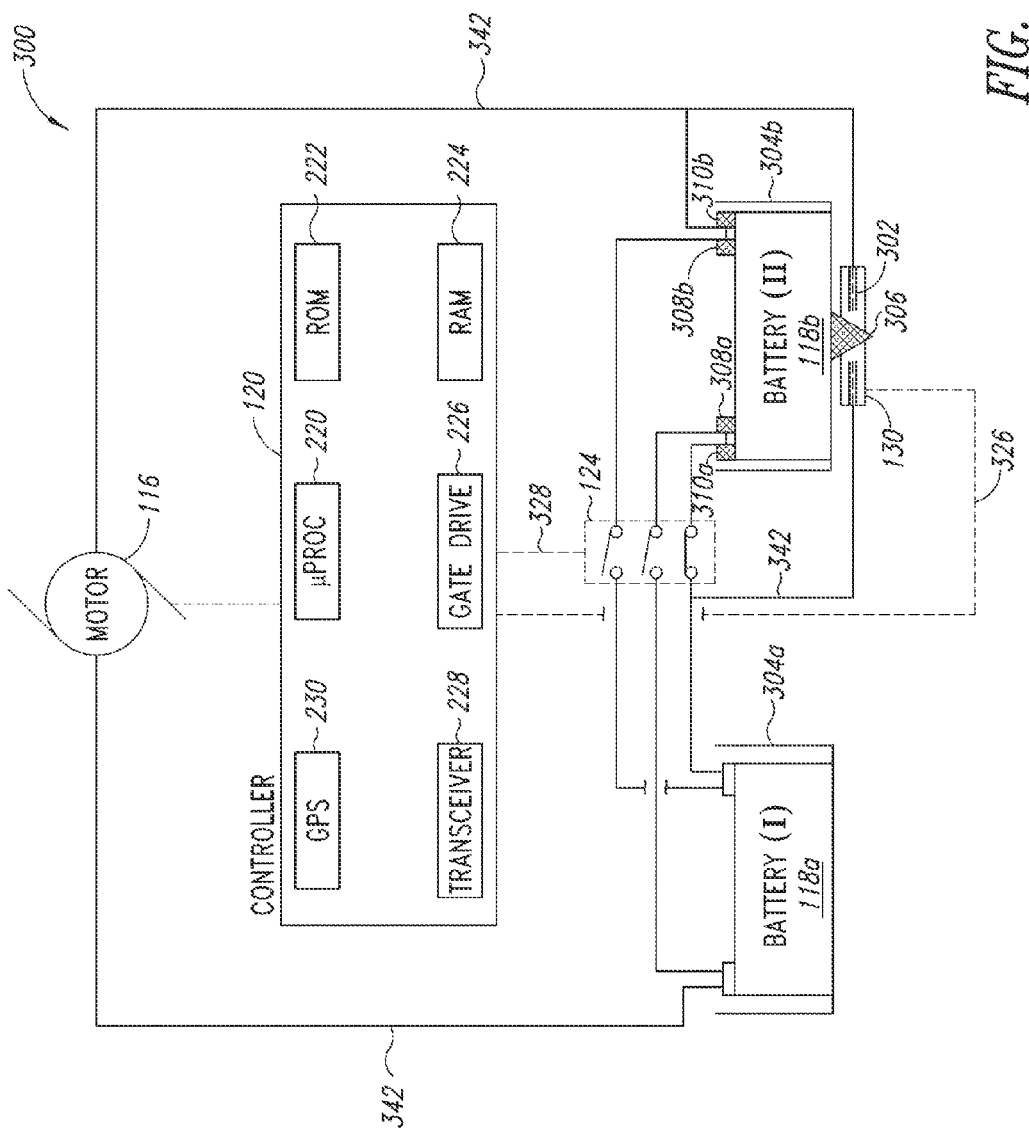
FIG. 3B is a schematic diagram of an electric vehicle with a frangible shunt circuit element in a second state placing the electric vehicle in a second operating mode that includes a plurality electrical energy storage devices arranged in a first operating configuration where at least a portion of the plurality of electrical energy storage devices are electrically coupled in series with the electric vehicle prime mover, according to one non-limiting illustrated embodiment.

FIG. 3B shows a schematic diagram of an electric vehicle 100 such as a scooter having two electrical energy storage device receivers 304a, 304b (collectively "receivers 304"), according to one illustrated embodiment. As shown in FIG. 3B, receivers 304a, 304b each contain a single electrical energy storage device 118a, 118b, respectively. Placing the second electrical energy storage device 118b in the second electrical energy storage device receiver 304b causes the physical feature 306 to fracture or otherwise place the circuit element 130 in a non-electrically conductive state. With a plurality of electrical energy storage devices 118 coupled to the vehicle 100, the vehicle is in a second mode of operation or second operating mode in which the plurality of electrical energy storage devices 118 provide energy to the prime mover 116.

In an implementation such as that depicted in FIG. 3B, the at least one switching device 124 is shown in a first state that selectively places the two electrical energy storage devices 118 in a first operating configuration in which the electrical energy storage devices 118 are in an electrical series arrangement with the prime mover 116. Such an arrangement can provide energy to the prime mover 116 for a longer duration but at a higher voltage than a parallel arrangement of the electrical energy storage devices 118 with the prime mover 116.

In at least some instances, the vehicle operator can manually place or otherwise change the state of the at least one switching device 124 to the first state to place the electrical energy storage devices 118 in electrical series with the prime mover 116. In other instances, the controller 120 can autonomously place or otherwise position the at least one switching device 124 in the first state to place the electrical energy storage devices 118 in electrical series with the prime mover 116. Placing the at least one switching device 124 in the first state may increase one or more vehicle performance characteristics, such as the torque and/or power developed by prime mover 116.

Figure 3C:
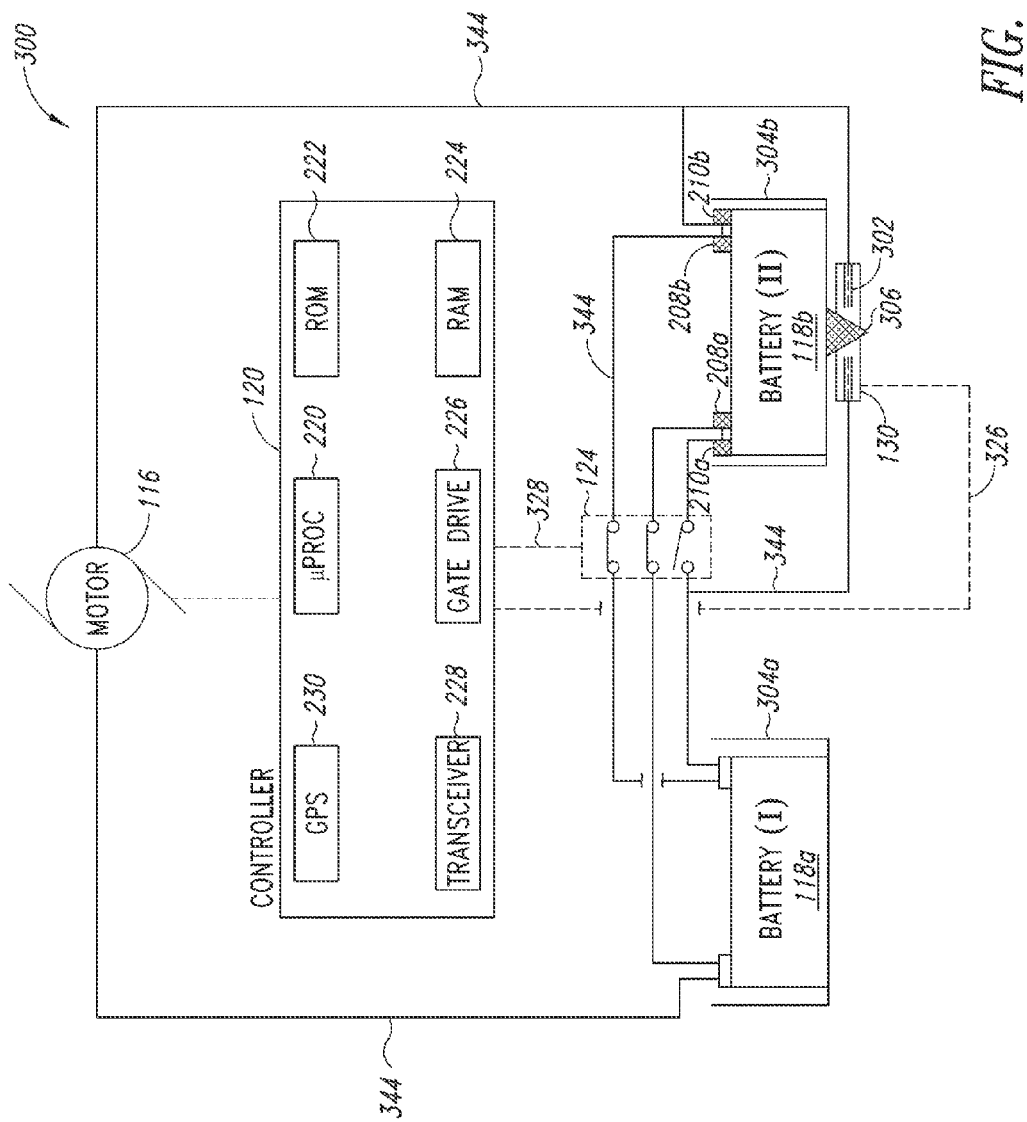
FIG. 3C is a schematic diagram of an electric vehicle with a frangible shunt circuit element in a second state placing the electric vehicle in a second operating mode that includes a plurality of electrical energy storage devices arranged in a second operating configuration where at least a portion of the electrical energy storage devices are electrically coupled in parallel with the electric vehicle prime mover, according to one non-limiting illustrated embodiment.

FIG. 3C shows a schematic diagram of an electric vehicle 100 such as a scooter having two electrical energy storage device receivers 304, according to one illustrated embodiment. As shown in FIG. 3C, receivers 304a, 304b each contain a single electrical energy storage device 118a, 118b, respectively. Placing the second electrical energy storage device 118b in the second electrical energy storage device receiver 304b causes the fracture or placement of the circuit element 130 into a non-electrically conductive state. Responsive to coupling the plurality of electrical energy storage devices 118 to the vehicle 100, the vehicle is placed in a second mode of operation or second operating mode in which the plurality of electrical energy storage devices 118 provide energy to the prime mover 116.

In an implementation such as that depicted in FIG. 3C, the at least one switching device 124 is shown in a second state that selectively places the two electrical energy storage devices 118 in a second operating configuration in which the electrical energy storage devices 118 are in an electrical parallel arrangement with the prime mover 116. Such an arrangement can provide energy to the prime mover 116 at a lower voltage but for a longer duration than a serial arrangement of the electrical energy storage devices 118 with the prime mover 116.

In at least some instances, the vehicle operator can manually place or otherwise change the state of the at least one switching device 124 to the second state to place the electrical energy storage devices 118 in electrical parallel with the prime mover 116. In other instances, the controller 120 can autonomously place or otherwise position the at least one switching device 124 in the second state to place the electrical energy storage devices 118 in electrical parallel with the prime mover 116. Such an autonomous adjustment may be made by the controller 120 to increase the operating range of the vehicle 100 in response to a detected low remaining charge in one or more electrical energy storage devices 118.

Figure 4:
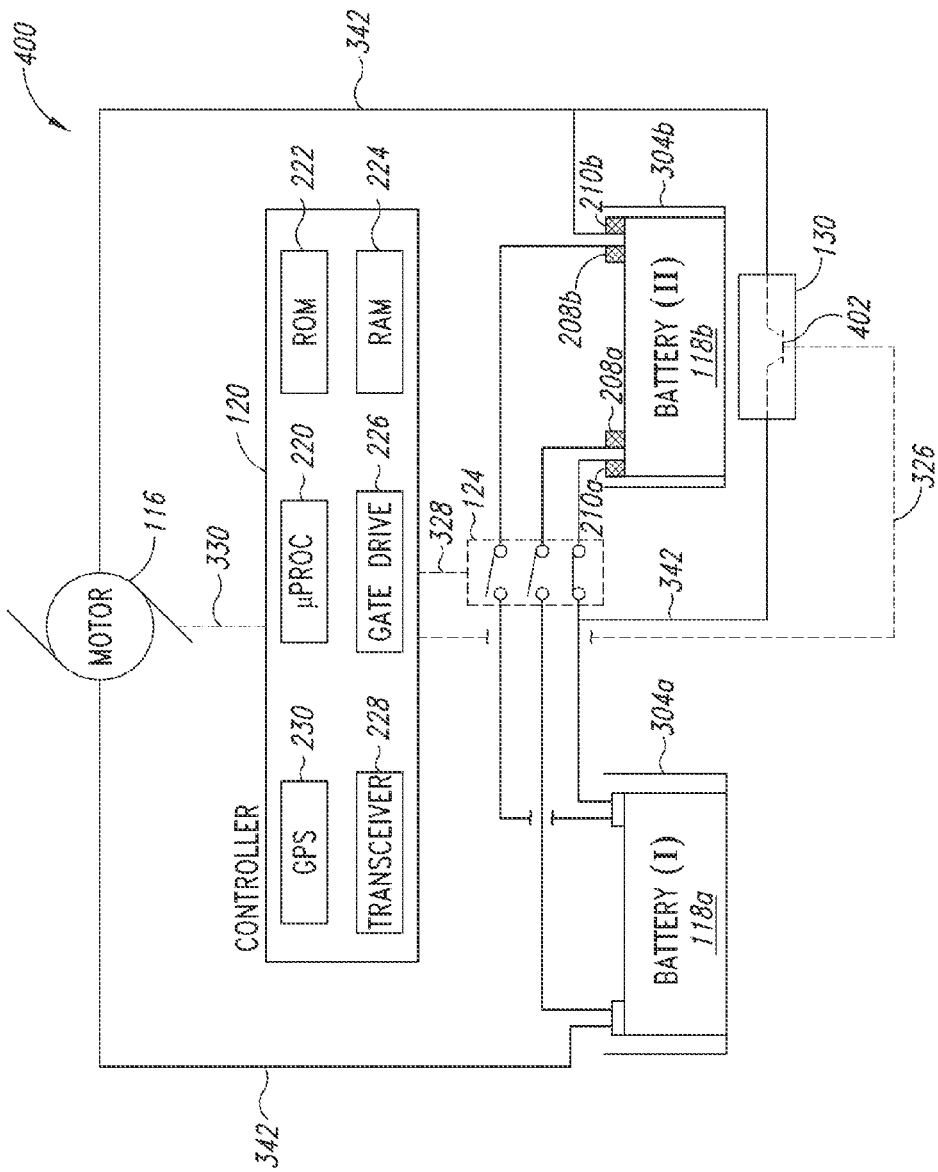
FIG. 4 is a schematic diagram of an electric vehicle with a controller operated semiconductor circuit element in a second state placing the electric vehicle in a second operating mode that includes a plurality electrical energy storage devices arranged in a first operating configuration where at least a portion of the plurality of electrical energy storage devices are electrically coupled in series with the electric vehicle prime mover, according to one non-limiting illustrated embodiment.

FIG. 4 shows a schematic diagram of an electric vehicle 100 such as a scooter having two electrical energy storage device receivers 304a, 304b (collectively "receivers 304"), according to one illustrated embodiment. As shown in FIG. 4, receivers 304a, 304b each contain a single electrical energy storage device 118a, 118b, respectively. Also as shown in FIG. 4, a mechanical, electromechanical, electronic, or semiconductor switch ("switching device 402") can provide the circuit element 130 in lieu of the frangible shunt type circuit element 130 depicted in FIGS. 3A-3C.

The use of the switching device 402 beneficially provides the ability to reset the vehicle 100 from the second operating mode (i.e., a two electrical energy storage device mode) to the first operating mode (i.e., a one electrical energy storage device mode) without requiring the physical replacement or restoration of the circuit element 130. In some instances, the vehicle operator can reset the operating mode of the vehicle 100, for example by providing a defined code or password to the controller 120. In some instances, one or more remote devices (e.g., one or more backend systems communicably coupled to the vehicle 100, the electrical energy storage device 118, or similar vehicular components) can reset the operating mode of the vehicle by changing the state of the circuit element 130. In one example, the backend system can wirelessly communicate (e.g., via a smartphone communicably coupled to the vehicle 100, or directly via GSM or CDMA to the transceiver 228 in the vehicle 100) one or more commands or executable instruction sets to the controller 120 that cause the controller 120 to transition the circuit element from the second state to the first state. In another example, a nontransitory storage media communicably coupled to the vehicle 100 can store one or more commands or executable instruction sets provided by the backend system that cause the controller 120 to transition the circuit element from the second state to the first state.

In at least some instances, the switching device 402 can include one or more mechanical switches. For example, the switching device 402 can include a single-pole, single-throw ("SPST") selector or toggle switch having a first, electrically continuous, state and a second, electrically discontinuous, state. In some instances, the mechanical switch can include an integrated lock or other feature that prevents an unintended transition from the first state to the second state. In other instances, the mechanical switch can include one or more actuators capable of positioning the switch in the first and second states. In such instances, the controller 120 can automatically control the position of the mechanical switch using electrical signals communicated to the actuator via the one or more circuits 326.

In other instances, the switching device 402 can include one or more electromechanical switches. For example, the switching device 402 can include one or more solenoid actuated relays having a first, electrically continuous, state and a second, electrically discontinuous, state. In at least some instances, the state of the electromechanical switch can change based on the presence or absence of an electrical current flowing through the solenoid. In some instances, the vehicle operator can manually control the electrical current supplied to the pilot solenoid. In other instances, the controller 120 can automatically control the electrical current supplied to the pilot solenoid via the one or more circuits 326.

In yet other instances, the switching device 402 can include one or more semiconductor switches. For example, the switching device 402 can include one or more transistors such as an insulated gate bipolar transistor ("IGBT"). In at least some instances, the controller 120 can automatically control the electrical the state of the semiconductor switch via the one or more circuits 326.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled APPARATUS, METHOD AND ARTICLE FOR A POWER STORAGE DEVICE COMPARTMENT' and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314 filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,038 filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES" U.S. application Ser. No. 13/559,054 filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390 filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343 filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", U.S. application Ser. No. 13/559,064 filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES", U.S. Provisional Application Ser. No. 61/778,038 filed on Mar. 12, 2013, naming Hok-Sum Horace Luke as inventor and entitled "APPARATUS, METHOD AND ARTICLE FOR CHANGING PORTABLE ELECTRICAL POWER STORAGE DEVICE EXCHANGE PLANS", U.S. Provisional Application Ser. No. 61/780,781 filed on Mar. 13, 2013, naming Hok-Sum Horace Luke as inventor and entitled "APPARATUS, METHOD AND ARTICLE FOR PROVIDING INFORMATION REGARDING A VEHICLE VIA A MOBILE DEVICE", U.S. Provisional Application Ser. No. 61/773,614 filed on Mar. 6, 2013, naming Hok-Sum Horace Luke, Feng Kai Yang, and Jung-Hsiu Chen, as inventors and entitled "APPARATUS, METHOD AND ARTICLE FOR PROVIDING TARGETED ADVERTISING IN A RECHARGEABLE ELECTRICAL POWER STORAGE DEVICE DISTRIBUTION ENVIRONMENT", U.S. Provisional Application Ser. No. 61/789,065 filed on Mar. 15, 2013, naming Hok-Sum Horace Luke, Matthew Whiting Taylor, and Huang-Cheng Hung as inventors and entitled "MODULAR SYSTEM FOR COLLECTION AND DISTRIBUTION OF ELECTRIC STORAGE DEVICES", U.S. Provisional Application Ser. No. 61/773,621 filed on Mar. 6, 2013, naming Hok-Sum Horace Luke and Ching Chen as inventors and entitled "APPARATUS, METHOD AND ARTICLE FOR AUTHENTICATION, SECURITY AND CONTROL OF PORTABLE CHARGING DEVICES AND POWER STORAGE DEVICES, SUCH AS BATTERIES", U.S. application Ser. No. 13/918,703 filed on Jun. 14, 2013, naming Ching Chen, Matthew Whiting Taylor, Jui Sheng Huang, and Hok-Sum Horace Luke as inventors and entitled "APPARATUS, SYSTEM, AND METHOD FOR AUTHENTICATION OF VEHICULAR COMPONENTS", and U.S. Provisional Application Ser. No. 61/862,854 filed on Aug. 6, 2013, naming Ching Chen, Alex Wu, Hok-Sum Horace Luke, and Matthew Whiting Taylor as inventors and entitled "ADJUSTING ELECTRIC VEHICLE SYSTEMS BASED ON AN ELECTRICAL ENERGY STORAGE DEVICE THERMAL PROFILE" are incorporated herein by reference, in their entirety. Aspects of the embodiments can be modified, if necessary, to employ systems, circuits and concepts of the various patents, applications and publications to provide yet further embodiments.

While generally discussed in the environment and context of power system for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A power delivery system to deliver electric power to an electric vehicle prime mover, the system comprising:
   a prime mover;
   a circuit that electrically couples the prime mover to one or more electrical energy storage devices; and
   at least one circuit element having a number of operational states, including at least:
      a first state in which an electric vehicle is placed in a first operating mode where energy is supplied by a single electrical energy storage device to the electric vehicle prime mover; and
      a second state in which an electric vehicle is placed in a second operating mode where energy is supplied by a plurality of electrical energy storage devices to the electric vehicle prime mover;
      wherein the first state does not preclude a subsequent transition by the at least one circuit element to the second state; and
      wherein the second state does preclude a subsequent transition by the at least one circuit element to the first state.

2. The power delivery system of claim 1 wherein the at least one circuit element includes at least one frangible shunt;
   wherein, in the first mode, the at least one frangible shunt is electrically conductive; and
   wherein, in the second mode, the at least one frangible shunt is electrically non-conductive.

3. The power delivery system of claim 2 wherein the at least one frangible shunt includes at least one circuit component that is not user replaceable.

4. The power delivery system of claim 2 wherein the at least one frangible shunt includes at least one circuit component that is user replaceable.

5. The power delivery system of claim 2, further comprising:
   a controller operably coupled to the at least one circuit element to receive information from the at least one circuit element, the information including data indicative of the state of the at least one circuit element;
   wherein responsive to receipt of data indicative that the circuit element has entered the second state, the plurality of electrical energy storage devices can be selectively configured to provide at least one of: an operating configuration in which at least a portion of the electrical energy storage devices are placed in electrical series; an operating configuration in which at least a portion of the electrical energy storage devices are placed in electrical parallel; or an operating configuration in which at least some of the electrical energy storage devices are placed in electrical parallel and at least some of the electrical energy storage devices are placed in electrical series.

6. The power delivery system of claim 1, further comprising a controller operably coupled to the at least one circuit element wherein the at least one circuit element includes at least one solid state switching device.

7. The power delivery system of claim 6 wherein, in the first state, at least one aspect of the at least one solid state switching device is modulated by the controller to permit the flow of power from the single electrical energy storage device to the prime mover.

8. The power delivery system of claim 7 wherein, in the second state, at least one aspect of the at least one solid state switching device is modulated by the controller to permit the flow of power from some or all of the plurality of electrical energy storage devices to the prime mover.

9. The power delivery system of claim 6, further comprising a communications interface communicably coupled to the controller, the communications interface to receive one or more signals including data to cause the transition of the at least one circuit element from the first state to the second state and to cause the transition of the at least one circuit element from the second state to the first state.

10. A power delivery method to deliver energy to a vehicular prime mover, the method comprising:
  delivering in a first operating mode, energy from a single electrical energy storage device to a vehicular prime mover via a circuit containing at least one circuit element in a first state;
  transitioning the at least one circuit element from the first state to a second state, and transitioning to a second operating mode, responsive to the electrical coupling of a plurality of electrical energy storage devices to the prime mover; and
  precluding a subsequent transition of the at least one circuit element from the second state to the first state after the at least one circuit element has transitioned to the second state.

11. The power delivery method of claim 10, further comprising:
  receiving at a controller communicably coupled to the at least one circuit element a signal including data indicative of a state of the at least one circuit element.

12. The power delivery method of claim 11, further comprising:
  responsive to the receipt of data indicative that the at least one circuit element has entered the second mode, selectively placing the vehicle in a first operating configuration in which at least a portion of the plurality of electrical energy storage devices are coupled in electrical series with the vehicular prime mover or in a second operating configuration in which at least a portion of the plurality of electrical energy storage devices are coupled in electrical parallel with the vehicular prime mover.

13. The power delivery method of claim 12 wherein selectively placing the vehicle in a first operating mode or in a second mode includes:
  selectively, autonomously, placing the vehicle in the first operating configuration or in the second operating configuration via the controller.

14. The power delivery method of claim 10 wherein transitioning the at least one circuit element from the first state to a second state includes:
  physically altering the construction of the at least one circuit element such that an electrical continuity property of the at least one circuit element is changed.

15. The power delivery method of claim 14 wherein precluding a subsequent transition of the at least one circuit element from the second state to the first state after the at least one circuit element has transitioned to the second state:
  irreversibly interrupting the electrical continuity property of the at least one circuit element.

16. The power delivery method of claim 15 wherein irreversibly interrupting the electrical continuity property of the at least one circuit element includes:
  irreversibly interrupting the electrical continuity property of the at least one circuit element using a physical feature disposed on an exterior surface of at least one of the plurality of electrical energy storage devices.

17. The power delivery method of claim 15 wherein irreversibly interrupting the electrical continuity property of the at least one circuit element includes:
  irreversibly interrupting the electrical continuity property of the at least one circuit element by creating a thermal overload condition or an overcurrent condition using some or all of the plurality of electrical energy storage devices, the thermal overload condition or the overcurrent condition sufficient to irreversibly physically damage the at least one circuit element.

18. The power delivery method of claim 10 wherein transitioning the at least one circuit element into a second mode of operation includes:
  electrically or electromagnetically altering an electrical property of at least one solid-state circuit element.

* * * * *